United States Patent [19]
Hutton et al.

[11] 3,964,024
[45] June 15, 1976

[54] TRANSPONDER FOR AN AUTOMATIC VEHICLE IDENTIFICATION SYSTEM

[75] Inventors: Thomas J. Hutton; John W. Kramer, both of Pittsburgh, Pa.

[73] Assignee: Westinghouse Air Brake Company, Swissvale, Pa.

[22] Filed: Nov. 15, 1974

[21] Appl. No.: 524,138

[52] U.S. Cl. .................. 340/152 T; 343/6.8 LC; 340/38 L
[51] Int. Cl.² .................. H04Q 9/00; G01S 9/56
[58] Field of Search ............ 340/152 T, 38 L, 24; 343/6.5 SS, 6.5 LC, 6.8 LC; 325/6

[56] References Cited
UNITED STATES PATENTS

| | | | |
|---|---|---|---|
| 3,290,675 | 12/1966 | Neild | 343/6.5 SS |
| 3,512,154 | 5/1970 | Farrar | 343/6.8 LC |
| 3,855,592 | 12/1974 | Davis et al. | 343/6.5 LC |
| 3,859,624 | 1/1975 | Kriofsky et al. | 340/38 L |

Primary Examiner—Donald J. Yusko
Attorney, Agent, or Firm—J. B. Sotak; R. W. McIntire, Jr.

[57] ABSTRACT

This disclosure relates to an inductively powered type of electronic transponder for identifying a moving object passing an interrogation area. The transponder includes a tuned inductive-capacitive pick-up circuit for receiving interrogating signals. The picked up interrogating signals are rectified to produce d.c. operating power and are applied to a frequency divider for producing a frequency related transmission signal and clock data rate pulse. A latching circuit enables a shift register so that the clock pulses serially shift out binary encoded data from the shift register. The encoded data is fed to a logic network which is coupled to a balanced switching amplifier for phase modulating the transmission signal for propagation into the interrogation area.

10 Claims, 2 Drawing Figures

TRANSPONDER FOR AN AUTOMATIC VEHICLE IDENTIFICATION SYSTEM

FIELD OF THE INVENTION

This invention relates to a transponder for an automatic vehicle identification system and more particularly to a receiver-transmitter circuit arrangement including a receiving coil tuned to the frequency of an interrogating signal, a rectifier for rectifying the interrogating signal and providing d.c. operating potential, a multistage digital divider for dividing the frequency of the interrogating signal and providing a data rate signal to a shift register, a logic network for receiving the divided frequency signal and supplying an amplifier, a latching network for enabling the shift register so that the stored binary encoded data phase modulates the divided frequency signal which is coupled by the amplifier to a tuned transmitting coil.

BACKGROUND OF THE INVENTION

In order to maximize the usage of the vehicles or rolling stock of various transportation systems, it has been found to be highly advantageous to automatically derive the identity and other necessary information from a moving train, mass transit car or bus as it passes a wayside point along its route of travel. It will be appreciated that an automatic vehicle identification system finds particular utility in railroad and mass and/or rapid transit operations. For example such a system has been employed in identifying the cars of a moving train entering a classification yard, a station or a switching conjunction or any other location along its route of travel. Similarly, such an automatic identification system may be utilized to obtain certain information from mass transit vehicles to establish and verify the times of arrival at stations or stopping points as well as to monitor the positions of the vehicles along this route of travel.

While the prior art discloses a number of arrangements for automatically identifying moving vehicles, these previous systems have suffered from one or more shortcomings, such as, being unreliable in operation due to climatic condition being expensive to maintain due to environmental adversities or being unacceptable due to inability to conform with certain requirements. In one previous system, it is proposed that each moving vehicle be equipped with one or more color coded label members which would be scanned by a source of white light so that reflected radiant energy would be directed back to a wayside scanning apparatus. The received reflected radiant energy is divided into two separate color paths for processing, decoding and providing signals which identify the particular vehicle carrying the coded label. The vehicle-carried labels include a plurality of reflective or non-reflective markings which are carried by a suitable backing member. The backing member is suitably attached to the side or sides of the given vehicle. In practice it has been found that the spectral response characteristics of the coded markings are greatly impaired by climatic and environmental conditions to the point where little if any intelligible information is received by the wayside scanner. That is, the build-up of dirt, grease, tar, oil, dust and other foreign matter covers and obliterates the coded markings so that the coded identity is unreadable unless the labels are frequently cleaned and reconditioned. Similarly the emitted rays of white light cannot effectively penetrate fog and mist and are blocked and dispersed by snow flakes and rain drops so that unacceptable and unsatisfactory readings occur during adverse climatic conditions. Another problem in reliable reading of the coded markings arises when the car-carried labels are skewed or tilted by uneven loading, swaying and vibrational movement which occurs as the moving vehicle passes a wayside scanner. Thus, it will be appreciated that the above noted vehicle identification system is expensive to maintain as well as unreliable in operation due to the outdoor milieu in which it is required to function.

In another prior art arrangement, it is suggested that a depending portion of a railway vehicle, such as, the truck or the like, be magnetized with a preselected polarity pattern to form the coded identity which is unique to the particular vehicle. Such a magnetic identification system is impractical for several reasons. First, it will be appreciated that railway vehicles are exposed to severe shock and vibration and experience continuous pounding which causes the alignment of dipoles in the cast iron trucks thereby creating magnetic regions having a much stronger intensity than that of the coded magnetic area. Hence, the significance of the magnetic code was destroyed or obliterated which has little, if any, relationship with the identity of the vehicle. Second, it is necessary to mount a magnetic reading head extremely, if not, illegally close to the track rail in order to detect the magnetic coded regions. Thus, the wayside reading device would not have the required clearance with the vehicle so that the system could not be approved and accepted by the railroad industry.

Yet another prior art system employs an electromagnetic scheme having a vehicle-carried transponder and a wayside stationed interrogator. The transponder includes passive elements which are inductively activated as they pass an interrogating station. Hence, the transponder provides a uniquely coded response signal when interrogated by an interrogating station which is thereafter decoded by the interrogation station to establish the desired input data relating to the characteristics of the particular moving vehicle upon which the transponder is mounted. It will be appreciated that passive responsive elements require precise physical alignment and are adversely influenced by a variety of environmental factors which affect the reliability and accuracy of the system. In addition, extraneous noise signals have an adverse effect on prior types of transponder-interrogator systems and result in the development of inaccuracies in the coded information transmitted by the transponder and received at the interrogating station.

Accordingly, it is an object of this invention to provide a new and improved transponder for an automatic vehicle identification system.

A further object of this invention is to provide an automatic vehicle identification system having a unique batteryless carborne transponder energized by an interrogating signal to produce coded signals peculiar to the particular vehicle.

Another object of this invention is to provide an improved transponder for generating a phase modulated coded signal for identifying a given object as it passes an interrogating area.

Still a further object of this invention is to provide a novel inert receiver-transmitter circuit arrangement responsive to an interrogating signal for providing d.c.

operating potential for energizing the receiver-transmitter whereby coded information is transmitted so long as the receiver-transmitter is under the influence of the interrogating signal.

Still another object of this invention is to provide a unique inductively powered type of transponder for transmitting a phase modulated message upon the reception of an interrogating signal.

Yet a further object of this invention is to provide a novel transponder having a pick-up coil supplying a rectifier network to produce d.c. operating power, a frequency divider, a shift register, a latching network, a logic network, and an amplifier fed transmitting coil for propagating a coded message upon the reception of an interrogating signal.

Yet another object of this invention is to provide a new and improved phase modulation transponder which is economical in cost, simple in design, reliable in operation, durable in service and efficient in operation.

SUMMARY OF THE INVENTION

In accordance with the present invention, the inductive type of transponder is employed in an automatic vehicle identification system for producing a coded message as the vehicle passes an interrogation location along its route of travel. The transponder includes a tuned receiver coil for picking up interrogating signals having a given frequency. A full-wave rectifier network is coupled to the receiver coil for rectifying the interrogating signals into d.c. operating potential. The interrogating signals are fed to a multistage frequency divider which is powered by the d.c. operating potential from the full-wave rectifier network. A shift register is coded with binary information and is powered by the rectified d.c. operating potential. The frequency divider produces a clock pulse which establishes the data rate for the shift register. The frequency divider also produces a frequency divided signal which is coupled to a "NOR" gate latching circuit and is fed to a NOR gate logic network. The shifter register is also coupled to the logic network. The logic network is connected to the input of a balanced two stage switching transistor amplifier which has its output coupled to a transmitting coil which is tuned to the frequency divided signal. When the moving vehicle enters the interrogation location, the interrogating signals are picked up and rectified to produce d.c. operating potential. The presence of d.c. operating voltage causes the frequency divider to divide the incoming interrogating signals into the frequency divided signal and also to produce data rate clock pulses which are fed to the shift register. The shift register is initially inhibited by the latching circuit so that the clock pulses have no effect, and a logical zero appears on the output of the shift register. The frequency divided signals are applied to the input of the amplifier via the logical network. Thus, one stage of the balanced switching amplifier is driven in phase with the frequency divided signals while the other stage is 180° out of phase due to the inverting action of the logic network. Hence, an a.c. output signal which is in phase with the frequency divided signal is developed in the transmitting coil and is propagated into the interrogating area. At a present threshold voltage the latching circuit enables the shift register so that the coded bits of the message are shifted out in serial fashion. In practice, the initial bits of the coded message are binary "0's" so that the a.c. output signal remains in phase with the frequency divided signal. Upon the appearance of a binary "1" in the serial output message, the logic network reverses the conduction of the two stages of the amplifier so that a phase shift occurs in the output and in the voltage developed in the transmitting coil. Thus, the logic network inverts the frequency divided signal when a logical 1 appears on the output of the shift register while a logical 0 results in no change in the phase relationship. Hence, the frequency divided signal is phase modulated in accordance with the binary coded data that is stored in the shift register. The phase modulated signals will continue to be transmitted so long as the vehicle is in the interrogating area and the receiver coil picks up the interrogating signals. In practice the total time that the transponder is in the interrogating area is sufficient to receive the entire coded message which may include synchronization data and error checking bits. When the vehicle passes beyond the interrogating area, the interrogating signals will no longer be picked up by the receiver coil. The lack of interrogating signals results in the loss of the d.c. operating potential so that the transponder becomes inactive and ceases to transmit the phase modulated signals.

BRIEF DESCRIPTION OF THE DRAWINGS

The foregoing objects and other attendant features and advantages of this invention will become more fully evident from the detailed description when analyzed and considered in conjunction with the accompanying drawings wherein.

DESCRIPTION OF THE INVENTION

Figure 1:
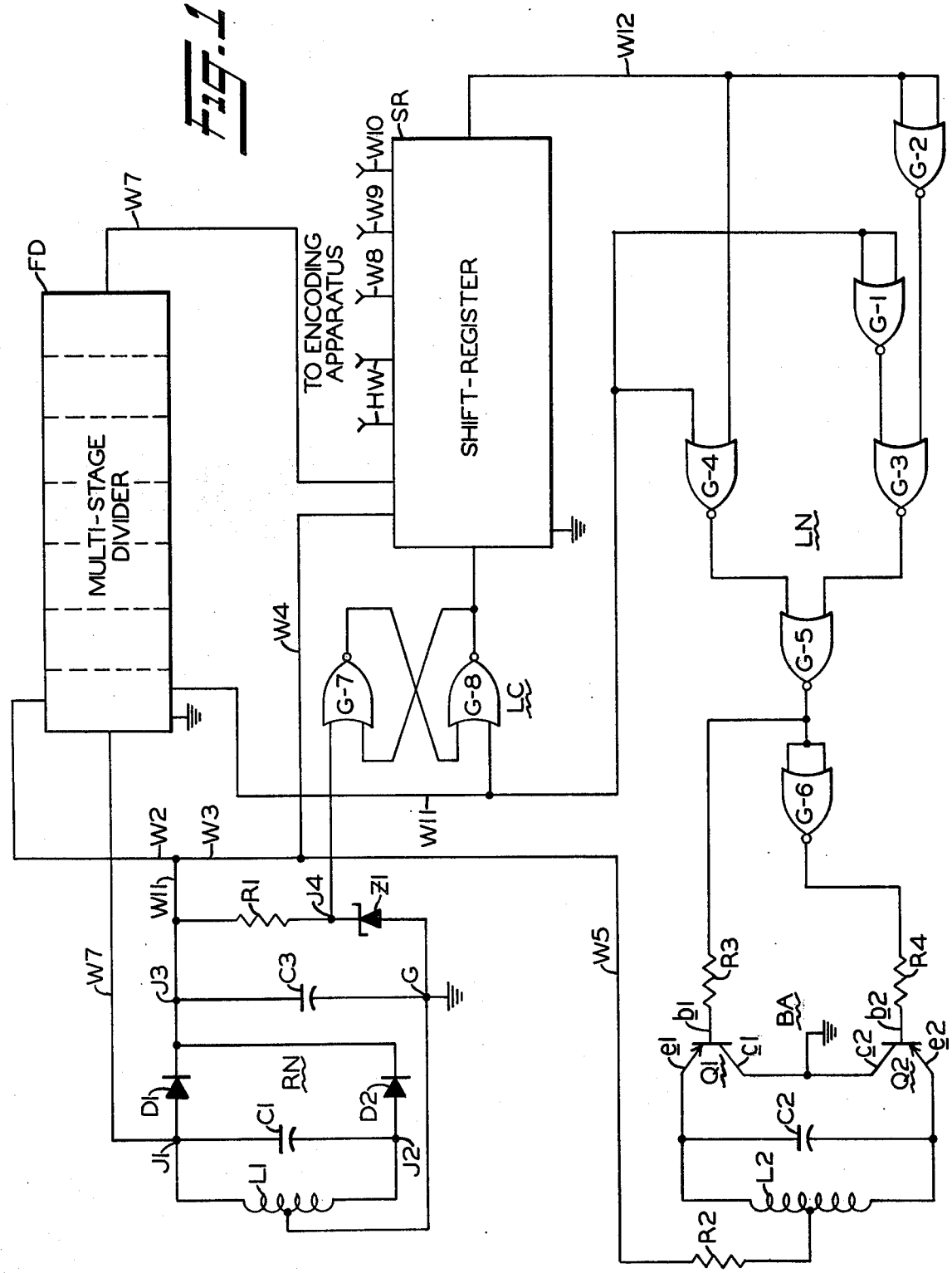
FIG. 1 is a schematic circuit diagram partially in block form of an inductive type of transponder for an automatic vehicle identification system in accordance with the present invention.

Referring now to the drawings and in particular to FIG. 1, there is shown an inductive type of transponder or receiver-transmitter circuit arrangement for use in an appropriate automatic vehicle identification system, such as, railroad, mass and/or rapid transit operations and the like. The transponder includes a receiver coil L1, a full-wave rectifier network RN, a frequency divider FD, a shift register SR, a latching circuit LC, a logic network LN, a balanced amplifier BA and a transmitter coil L2. The receiver and transmitter coil L1 and L2 of the transponder are incapsulated and hermetically sealed in a weather-proof fiberglass unit which is bolted to a rigid metal protective frame. The coil unit and frame are mounted to the underside of the vehicle so that interrogating signals are picked up by the receiver coil L1 when the vehicle passes over an interrogator transmitter coil which is embedded in or located on the roadway along the route of travel. The vehicle-carried coils are connected to a programmable module or selector control box via pretuned coaxial cables. The module or box houses the various components or elements of the transponder and is mounted on the control panel or deck in the motorman's cab or operator's location. The programmable module includes a plurality of thumb wheels or selection dials to set the number or identity of the particular vehicle carrying the transponder. For example, a units, tens, hundreds, thousands etc. dial may be manually manipulated to provide data entry, namely, the numerical designation of the vehicle which forms part of the encoded message stored in the shift register as will be described hereinafter.

In viewing FIG. 1, it will be noted that the receiving or pick up coil L1 is tuned to the frequency, for example 100KHZ of an interrogating signal by a tuning capacitor C1. The inductor and capacitor form a parallel tuned circuit for picking up interrogating signals from the roadway as the vehicle passes over an interrogation loop suitably located at a station or at some other check point along which the vehicle travels. The picked up interrogating signals have the multiple role of providing d.c. operating power for the component parts or circuits of the transponder as well as establishing the carrier frequency signal and the clock pulses. As shown, a portion of the interrupting signals is rectified by full-wave rectifier network including diodes D1 and D2. The anode electrode of diode D1 is connected to the upper junction point J1 of inductor-capacitor L1-C1 while the anode electrode of diode D2 is connected to lower junction J2 of the inductor-capacitor L1-C1. The cathode electrodes of diodes D1 and D2 are connected in common to positive junction point J3. A common or ground lead is connected from a center tap on inductive loop L1 to ground terminal G. A smoothing capacitor C3 is connected from positive d.c. junction point J3 and ground point G to removed ripple voltage and spurious noise. As shown the positive supply terminal provides d.c. operating potential for the various networks and circuits of the transponder. It will be seen that the multi-stage frequency divider FD is supplied d.c. operating voltage via conductor or leads W1 and W2 while the shift register SR is supplied positive voltage via conductive wires W1, W3 and W4. Likewise, the center tap of coil L2 of transistor balanced amplifier BA is connected to the positive d.c. voltage junction point via leads W1, W3, W5 and current limiting resistor R2. It will be appreciated that d.c. operating power is also supplied to the latching circuit and the logic network. However, in order to avoid confusion and for the purpose of convenience the supply connections and the grounds have not been illustrated in FIG. 1 of the drawings.

It will be noted that a current-limiting resistor R1 and a voltage breakdown device, such as, a zener diode Z1 are serially connected across d.c. terminals J3 and G. The junction point J4 between resistor R1 and zener diode Z1 is connected by lead W6 to the latching circuit LC the purpose of which will be described hereinafter.

In practice, the frequency divider is a conventional multi-stage unit employing a plurality of cascaded bistable circuits, such as, semiconductive flip-flop circuit transistor multivibrators. Each stage or multivibrator of the frequency divider will halve the frequency of the applied input signal. Thus, the initial multivibrator stage will produce an $f/Z$ carrier signal where $f$ is the frequency of the receiver interrogating signals, namely, the 100KHZ is divided by Z. It will be observed that the interrogating signals appearing at junction J3 are applied to the input of the frequency divider FR via lead W7. It will be seen that a clock or timing signal is derived from the final flip-flop stage of the frequency divider and has a frequency of $f/Zn$ where $n$ is an interger. As shown, the clock frequency signal which establishes the data rate is derived from the final stage of the divider FD and is coupled to the shift register via conductor W7.

The shift register SR is a suitable parallel-input serial-output network including a plurality of bistable devices, such as, transistorized multivibrators. In practice, the clock pulses are applied over lead W7 jointly to the appropriate inputs of the respective solid-state flip-flop circuits. The vehicle identification number is binarily encoded by hard wiring at the factory or is established by manual manipulation of thumbwheels by the operator which encodes the information into the shift register SR via leads W8, W9 and W10. While a three digit identification number is sufficient in a transit operation having less than a thousand (1,000) vehicles, it is understood that the shift register may be expanded to accommodate a transportation system having a much greater number of vehicles. In addition, the encoded message includes other stored characters, such as start of test, carriage return, line feed, end on feed, parity check, stop or any other data for instructions or control functions to a computer and/or teletype printer employed at the interrogation location or at central control. In practice, the shift register remains initially disenabled so that a logical zero (0) appears at its output terminal when the transponder reaches and begins to pass the forward end to the interrogation loop. In viewing FIG. 1, it will be noted that the latching circuit LC is employed to enable the shift register SR to allow the clock pulses to shift the binary data in serial form. As shown, the latching network includes a pair of NOR logic gates G-7 and G-8. As mentioned above, lead W6 provides a positive or high signal to one of the inputs of NOR gate G-7 which has its output fed back to one of the inputs of NOR gate G-8. The output of NOR gate G-8 is fed back to the other input of the NOR gate G-7. The other input of the NOR gate G-7 is connected to the output of the first stage of the frequency divider via conductive lead W11.

It will be seen that the lead W11 also is connected to the input of the logic network LN which includes the NOR gates G-1, G-2, G-3, G-4, G-5 and G-6. Specifically, the conductor W11 is connected to one input of the NOR logic gate G-4 as well as to both of the inputs of the NOR gate G-1. As shown, the output from the shift register SR is connected to the other input of NOR gate G-4 as well as to both of the inputs of the NOR gate G-2 via lead W12. The output of NOR logic gate G-2 is connected to one of the inputs of NOR gate G-3 while the output of NOR gate G-1 is connected to the other input of the NOR gate G-3. The output of NOR gate G-3 is connected to one input of the NOR gate G-5 while the output of NOR gate G-4 is connected to the other input of NOR gate G-5. The output of NOR gate G-5 is connected to both of the inputs of the NOR gate G-6. The output of the NOR gate G-5 is also connected to the input of balanced switching amplifier while the output of NOR gate G-6 is also connected to the input of the balance switching amplifier BA.

The two stage balance switching amplifier BA includes a first PNP transistor Q1 having a base electrode $b1$, collector electrode $c1$ and an emitter electrode $e1$ and a second PNP transistor Q2 having a base electrode $bZ$, a collector electrode $c2$ and an emitter electrode $eZ$. As shown, the output of NOR logic gate G-5 is connected to the base electrode $b1$ of transistor Q1 via resistor R3 while the inverted output of NOR gate G-6 is connected to the base electrode $bZ$ of transistor Q2 via resistor R4. The collector electrodes $c1$ and $c2$ of transistors Q1 and Q2, respectively, are connected in common to ground. The emitter electrode $e1$ of transistor Q1 is connected to one end of the parallel tuned circuit formed by transmitting coil L2 and capacitor C2 while the emitter electrode $eZ$ of transistor Q2 is connected to the other end of the parallel tuned circuit. In practice, the parallel tuned circuit L2-C2 is tuned to the transmission frequency which is the $f/Z$ frequency derived from the first stage of the frequency divider FD.

Figure 2:
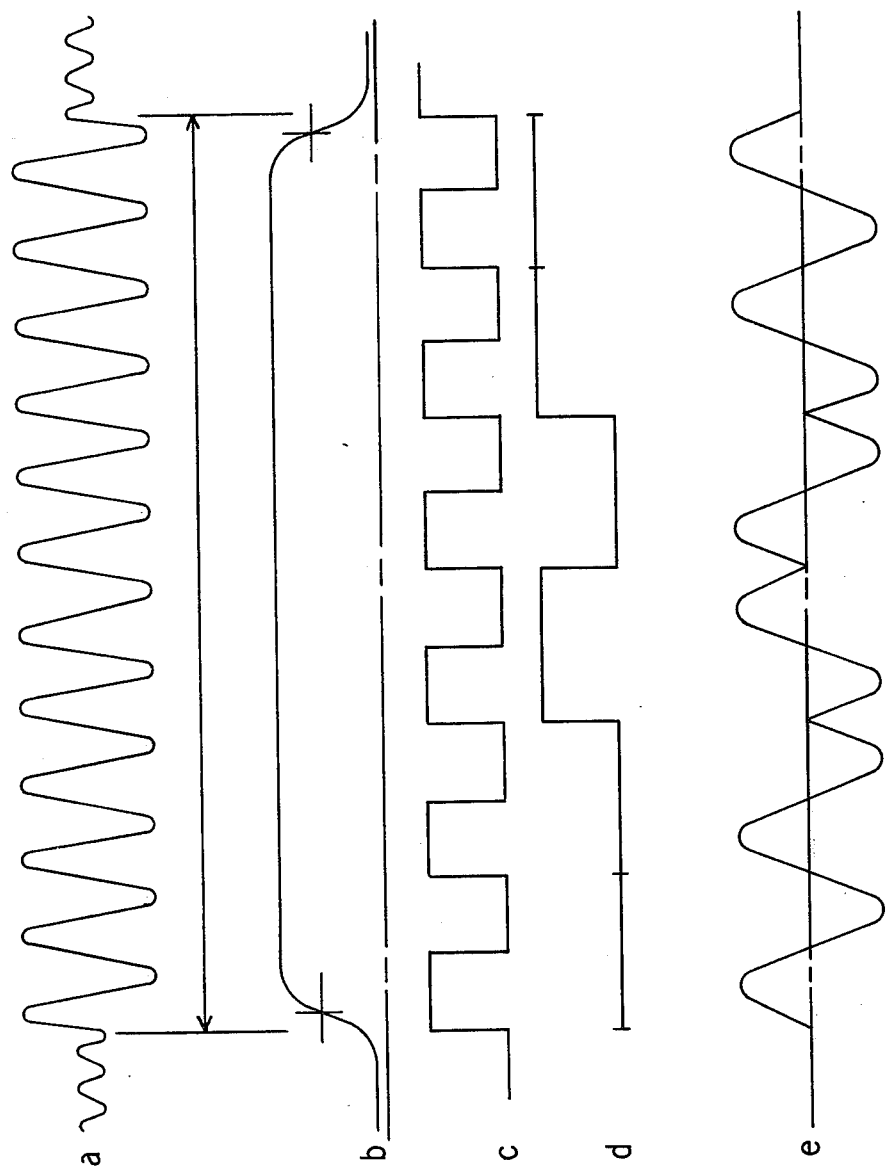
FIG. 2 is a timing diagram and graphical representation of the wave forms obtained from the receiving coil, the rectifier, the frequency divider, the shift register and the transmitting coil of the transponder illustrated in FIG. 1.

Turning now to the operation of the subject invention, it will be assumed that a vehicle carrying the transponder of FIG. 1 is approaching an interrogation location along the route of travel. It will be appreciated that the vehicle-carried transponder remains inert so that no energy is consumed until power is received from the wayside. When the transponder passes over the leading edge of the interrogation loop signals, such as, those illustrated by the waveforms (a) of FIG. 2 having a frequency of a 100KHZ are picked up by the receiving coil L1. The parallel resonant circuit including inductor-capacitor L1-C1 maximizes the amplitude of the received interrogating signals so that the full-wave rectifier including diodes D1 and D2 rectifies the a.c. signals. The d.c. voltage at junction joint J3 begins to rise in a positive direction as shown by curve (b) of FIG. 2. As previously mentioned, the capacitor C3 removes a.c. ripple voltage and noise, signals and the d.c. operating voltage developed at point J3 is applied to the respective frequency divider FD, shifter register SR and amplifier circuit via leads W1, W2, W3, W4 and W5 as well as to the latch circuit and logic network via suitable conductors (not illustrated). It will be appreciated that the a.c. interrogating signals are also applied to the input of the frequency divider FD via lead W7, and as the d.c. supply voltage reaches the operating level, the frequency divider FD is activated thereby causing a clock frequency signal to be applied to the shift register SR via lead W7. Likewise, the first stage of the frequency divider FD supplies an $f/Z$ frequency signal over lead W11 to the logic network LN and in turn to the balanced switching amplifier BA. Initially, the shift register is not enabled for serial operation so that a logical zero appears on lead W12 at this time. This causes the NOR gate G-2 to produce a logical 1 which inhibits the NOR gate G-3. The $f/Z$ signal applied to NOR gate G-4 is initially inverted and then is again inverted by NOR gate G-5. Thus, the output for NOR gate G-5 which is in phase with the $f/Z$ signal is applied to the input of transistor Q1 via resistor R3. Accordingly, the transistor Q1 is driven in phase with the output of the frequency divider. It will be seen that the output of NOR gate G-5 is inverted by the NOR gate G-6. Thus, the output from NOR G-6 which is 180° out of phase with the $f/Z$ signal is applied to the input of transistor Q2 via resistor R4. Accordingly, the balanced switching amplifier BA develops in phase amplified $f/Z$ output signals in the resonant circuit L2-C2 which are propagated into the interrogation area by the transmitter coil L2.

As the vehicle continues to move into the interrogation area and as the transponder picks up the interrogating signals, the level of the rectified d.c. voltage reaches a threshold point at which the latching circuit LC including NOR gates G-7 and G-8 is enabled. That is, when the positive d.c. voltage at junction exceeds the breakdown voltage of the zener diode Z1 a constant potential is applied to one input of NOR logic gate G-7 via lead W6. Thus, the latching circuit enables the shift register SR so that serial data of the storage message begins to be applied to the NOR logic gates G-2 and G-4 via leads W12. As previously mentioned, the data rate is dictated by the clock pulses which are applied to the shift register SR over lead W7. As shown in the waveform (c) of FIG. 2 several of the initial bits serially shifted out of the shift register SR are logical 0's so that the voltage developed across inductor LZ remains in phase as is shown by the waveform (d) of FIG. 2. When a logic 1 is shifted from the shift register SR, as shown by the third bit of curve (c), the NOR gate G-4 is inhibited while the NOR gate G-1 is enabled. The enabling of gate G-1 results in an inversion of the signals at the outputs of NOR gates G-5 and G-6 so that the conduction of the transistors Q1 and Q2 are reversed in phase. Thus, a logic 1 produces a 180° phase shift in the voltage developed in inductive coil L2 as shown by curve (d) of FIG. 2. Accordingly, a logic 0 of the stored message produces an output voltage which is in phase while a logical 1 of the stored message produces an output voltage which is 180° out of phase. Hence, the $f/Z$ signal is phase modulated in accordance with the logic significance of the data message in shift register SR. The transmitted signals will continue to be phase modulated in accordance with the encoded data in shift register SR as shown by waveforms (c) and (d) of FIG. 2 so long as the vehicle is in the interrogation area and the transponder is over the interrogating loop. The period of interrogation is of a sufficient time to permit the entire message including the synchronization, data and error checking bits to be transmitted at least once and preferably several times for redundancy purposes. It will be appreciated that the number of total message readouts is a function of the maximum speed of the moving vehicle, the length of the interrogating loop, the frequency of the interrogating signal and the rate of the clock pulses which may obviously be varied as desired. When the vehicle moves out of the interrogating area and the transponder passes beyond the trailing edge of the interrogating loop, the $f/Z$ signals induced into pickup coil L1 are markedly reduced and eventually disappear as shown in (a) of FIG. 2. This causes a rapid decrease in the level of the d.c. operating potential so that the $f/Z$ signal and the clock pulses cease to be produced. Thus, the transponder reverts to an inert condition since no d.c. power is available for operating the various circuits. The transponder will remain inactive until the vehicle again enters an interrogation area where interrogating signals are picked up to cause the propagation of the encoded message.

It is obvious that it is possible to transmit the signal at other frequencies, such as, $f/n$ frequencies where $n$ is an integer. Since $f/n$ can be derived from various stages of the frequency divider, it would be possible to have four phase states, for example, (0°, 180°, ± 90°) or (± 45°, ± 90°) where the frequency of the signal is $f/4$.

It will be appreciated that while the present invention finds particular utility in an identification system for railroad and mass and/or rapid transit operations, it is understood that the invention may be employed in various other environments and fields, such as, trucking, taxi and other moving object facilities.

In addition, it will be understood that various changes, modifications and alterations may be made without departing from the spirit and scope of the subject invention. For example, the logic may take the form of OR, AND or NAND gates, and the disclosed rectifier and amplifier may be replaced by other configuration in practicing the invention. Other changes and ramifications will undoubtedly occur to those skilled in the art that are deemed to fall within the purview of the present invention which is intended to be limited only as set forth in the appended claims. Thus, it is understood that the showing and description of the present invention should be taken in an illustrative or diagrammatic sense only.

Having now described the invention what we claim as new and desire to secure by Letters Patent, is:

1. A transponder for an automatic identification system comprising, a receiving coil tuned to the frequency of an interrogating signal, a rectifier for rectifying the interrogating signal to provide a source of d.c. operating potential for the transponder, a multi-stage divider for dividing the frequency of the interrogating signal into an $f/n$ frequency signal wherein n is an integer, a logic circuit including a plurality of gates receiving said $f/n$ frequency signal, an amplifier is supplied with said $f/n$ frequency signal by said gates of said logic circuit for amplifying said $f/n$ frequency signal, a shift register encoded with binary data, a latching circuit for enabling the shift register to transfer the encoded binary data to said logic circuit and in turn to said amplifier for phase modulating said $f/n$ frequency signal in accordance with said binary data, and a transmitting coil coupled to said amplifier and tuned to said $f/n$ frequency signal.

2. A transponder for an automatic identification system as defined in claim 1, wherein said receiving coil is tuned to the frequency of the interrogating signal by a capacitor connected in parallel with said receiving coil.

3. A transponder for an automatic identification system as defined in claim 1, wherein said rectifier is a full-wave rectifier employing a pair of diodes and including a smoothing capacitor.

4. A transponder for an automatic identification system as defined in claim 1, wherein said multi-stage divider provides a data rate signal to said shift register for determining the exiting rate of the encoded identification data.

5. A transponder for an automatic identification system as defined in claim 1, wherein said shift register includes a plurality of stages having its input supplied in parallel and its output derived in series.

6. A transponder for an automatic identification system as defined in claim 1, which said logic circuit includes a plurality of NOR gates.

7. A transponder for an automatic identification system as defined in claim 1, wherein said latching circuit includes a plurality of NOR gates having feedback.

8. A transponder for an automatic identification system as defined in claim 1, wherein said amplifier includes a pair of semiconductive devices connected in a push-pull configuration.

9. A transponder for an automatic identification system as defined in claim 8, wherein each of said semiconductive devices is a PNP transistor.

10. A transponder for an automatic identification system as defined in claim 1, wherein said transmitting coil is tuned to the $f/n$ frequency signal by a capacitor connected in parallel with said transmitting coil.

* * * * *